F. L. O. WADSWORTH.
DENSIFYING METAL.
APPLICATION FILED APR. 17, 1912.

1,050,879.

Patented Jan. 21, 1913.
3 SHEETS—SHEET 1.

WITNESSES:
J. Herbert Bradley
Francis J. Tomason

INVENTOR
Frank L. O. Wadsworth
by Christy & Christy, Atty's

F. L. O. WADSWORTH.
DENSIFYING METAL.
APPLICATION FILED APR. 17, 1912.

1,050,879.

Patented Jan. 21, 1913.
3 SHEETS—SHEET 3.

UNITED STATES PATENT OFFICE.

FRANK L. O. WADSWORTH, OF SEWICKLEY, PENNSYLVANIA.

DENSIFYING METAL.

1,050,879.  Specification of Letters Patent.  Patented Jan. 21, 1913.

Application filed April 17, 1912. Serial No. 691,416.

*To all whom it may concern:*

Be it known that I, FRANK L. O. WADSWORTH, residing at Sewickley, in the county of Allegheny and State of Pennsylvania, a citizen of the United States, have invented or discovered certain new and useful Improvements in Densifying Metal, of which improvements the following is a specification.

It is the object of the invention to produce rolled or forged metallic articles, the structure of which will be materially densified in a direction normal to that of the application of the forming pressure, as, for example, a plate or flat strip of iron or steel having its body structure densified in lines parallel with the plane of its surface. Such densification will not only render the article more resistant to penetration by harmful substances, but will also materially increase its mechanical strength.

In the accompanying drawings there are illustrated rolling-mills suitable for the practice of the invention in the production of various metallic articles.

Figure 1:
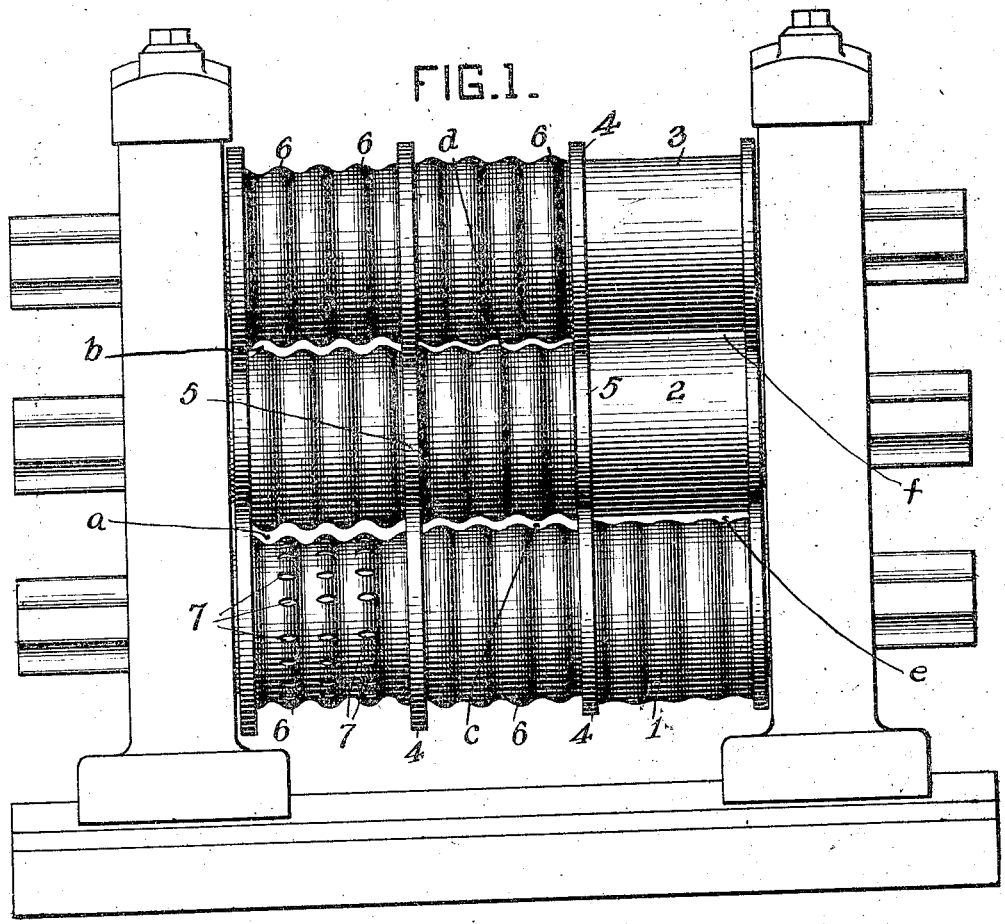
Figure 2:
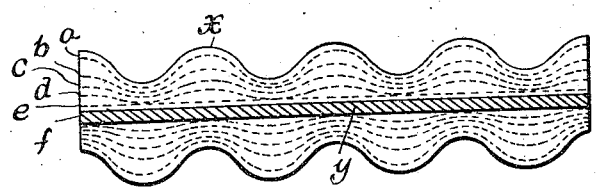
Figure 4:
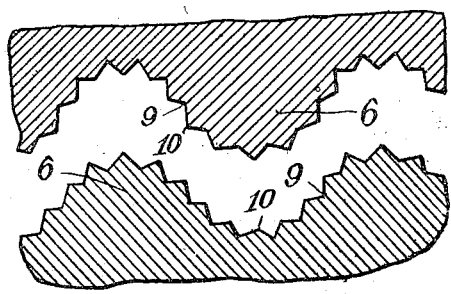
Figure 3:
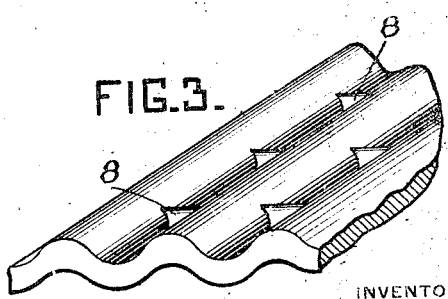
Figure 5:
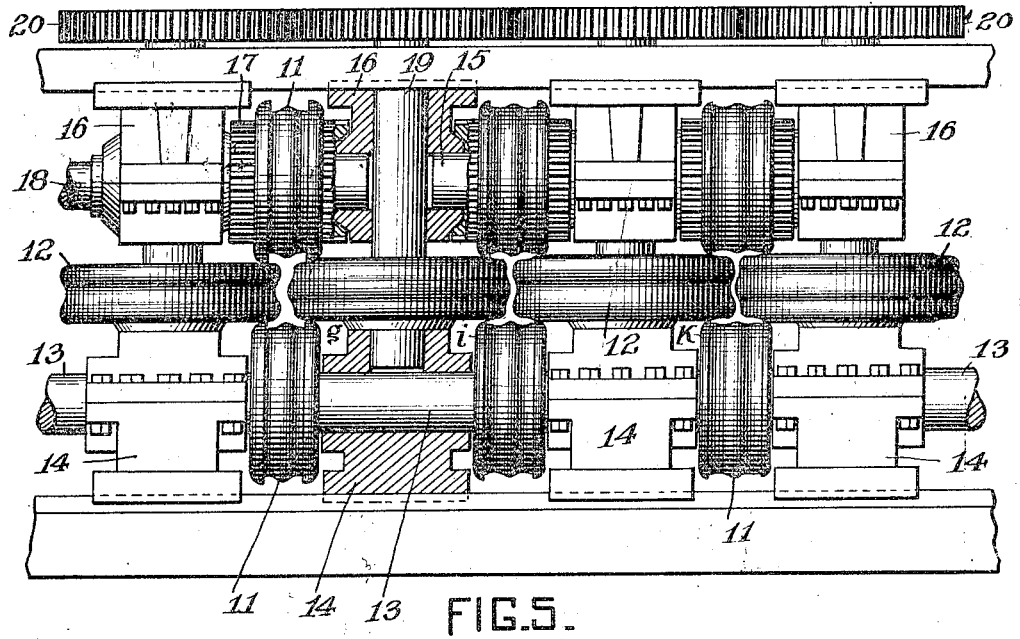
Figure 6:
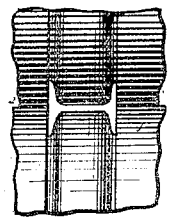
Figure 7:
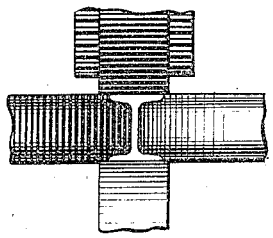
Figure 8:
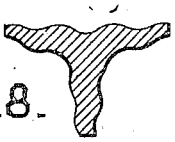
Figure 9:
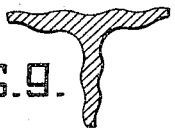
Figure 10:
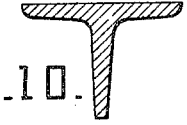
Figure 11:
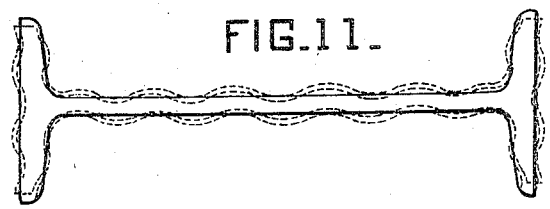
Figure 12:
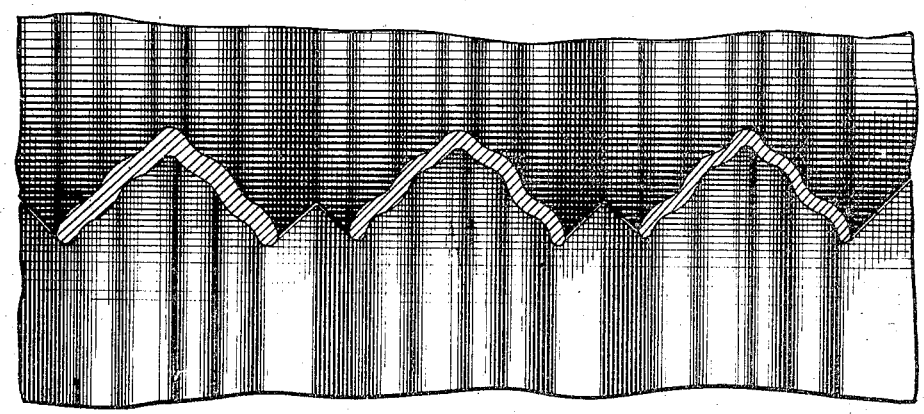
Figure 13:
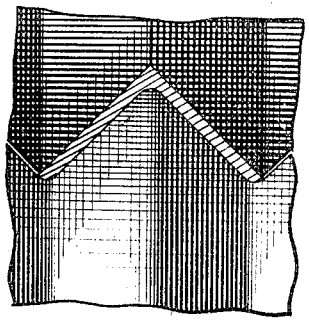

Figure 1 is an elevation of a stand of rolls for the production of metal plates or strips. Fig. 2 is a diagrammatic view illustrating the practice of the invention by the use of rolls of the form shown in Fig. 1. Fig. 3 is a fragmentary perspective view, on an enlarged scale, of an inverted piece of metal as it comes from the first pass of the stand of rolls of Fig. 1. Fig. 4 is a fragmentary sectional elevation of a modified form of roll pass. Fig. 5 is an elevation, partly in section, of a stand of rolls suitable for the practice of the invention in the manufacture of H-beams or I-beams, Figs. 6 and 7 illustrating different forms of finishing pass. Figs. 8, 9 and 10 illustrate the product of successive steps in the manufacture of a T-bar. Fig. 11 illustrates diagrammatically the product of the successive steps in the manufacture of a wide I-beam. Fig. 12 is a fragmentary elevation of a stand of rolls for the manufacture of angle-bars, and Fig. 13 is a like view of the finishing pass.

Referring first to Fig. 1, there is shown a three-high stand of horizontal rolls, 1, 2, 3, which are driven in any suitable or well-known manner, the top and bottom rolls 1 and 3 being provided with collars 4, fitting into grooves 5 in the middle roll 2, in order to inclose the passes for the metal being rolled. Six passes, *a, b, c, d, e,* and *f,* are shown, and are all preferably of substantially the same width.

The operative surfaces of the rolls in the passes *a, b, c* and *d* are given a sinuous form transversely of the line of travel of the piece being rolled, by means of the annular collars or protuberances 6 formed upon said surfaces, the protuberances upon the surfaces of the lower and upper rolls being arranged in vertical planes between and alternating with the vertical planes of the protuberances upon the surface of the middle roll, thus giving to each of said passes, and to the piece of metal being rolled therein, a sinuous cross-sectional form, as shown. The sinuosity of form of the successive passes is made less abrupt, that is, the sinuosity of the surface of the upper roll 3 in pass *b* is less abrupt than that of the lower roll 1 in pass *a*, and so on, so that the opposite surfaces of the piece are gradually formed into plane surfaces, the surface of the lower roll only in pass *e* being slightly sinuous, while both roll-surfaces in pass *f* are smooth. If desired, indentations or "bites" 7 may be formed in one or more of the rolling surfaces in one or more of the initial passes, in order to enable the rolls to more firmly grip the piece being rolled. Said bites will also have the further desirable effect of forming upon the surface of the piece being rolled, ribs such as indicated at 8, Fig. 3, which will act as braces between the ridges or flutes formed by the rolls.

In practice, a blank of sinuous cross-section, and preferably of a width not materially less than that of the passes in the stand of rolls described, is provided, and is heated to the proper rolling heat. The sinuosity of the blank is preferably somewhat more abrupt than that of pass *a*, and the blank may be so formed in any suitable manner, as in one or more of the last passes of the blooming mill. The heated blank is first fed forwardly through the lower pass *a*, then back through the upper pass *b*, forwardly through the lower pass *c*, back through the upper pass *d*, forwardly through the lower pass *e*, and back through the upper pass *f*, from which it emerges in the form of a flat plate or strip.

It will be apparent that in reducing the degree of sinuosity of the blank in the successive passes, the metal throughout its body will be laterally compressed, and locally condensed by the lateral pressure exerted upon it by the wedge-like coöperating annular protuberances 6 on the surfaces of the rolls, the lines of such local lateral compression merging into each other; and the piece being confined at its edges against any lateral spread, the particles composing the entire cross-section of the piece will be compressed laterally closely against each other, thus forming an extremely dense body structure.

The entire operation is shown diagrammatically in Fig. 2, the original blank being indicated by the full lines $x$, and the finished plate $y$ being shown in cross-section, the successive steps of reduction and consequent lateral condensation in the passes $a$, $b$, etc., being indicated by the dotted lines lettered to correspond.

It will of course be understood, that if desired the sinuous blank may be initially formed from a flat bloom or slab in the pass $a$ of the stand of rolls shown, and be then gradually flattened and reduced in the succeeding passes, without reheating.

In Fig. 4 the sinuous surfaces of the coöperating rolls are shown as further provided with grooves 9 and ridges 10, which it is believed will somewhat intensify the condensation at and near the surfaces of the piece.

In applying the invention to the manufacture of beams, a universal mill, such as is shown in Fig. 5, may be employed. There are here shown three passes, between horizontal rolls 11, 11, and vertical rolls 12, 12. The three lower horizontal rolls are fastened upon a single shaft 13, mounted in bearing-blocks 14, and driven by means of any suitable connection to the source of power. The upper horizontal rolls are each fastened upon short stub-shafts 15, mounted in bearings 16, and provided with pinions 17, meshing with corresponding pinions (not shown) on a suitably driven shaft 18 behind the rolls. The vertical rolls are fastened to vertical shafts 19, the lower ends of which are stepped in the bearing-blocks 14 above the shaft 13, and the upper ends of which are provided with intermeshing pinions 20, (which may be driven or not as desired), so that the piece may be drawn forwardly through pass $g$, back through pass $i$, and forwardly again through pass $k$.

The surfaces of both the horizontal and the vertical rolls are formed in the manner already described, so as to define passes for the web and the flanges of the beam, which shall be of sinuous cross-sectional form, as shown, and with a gradually diminishing degree of sinuosity in the successive passes. The bodily condensing action in both web and flanges is similar to that already described by reference to Fig. 1, and after the piece has emerged from pass $k$, it is finished in a pass having smooth surfaces, either in two horizontal rolls, as shown in Fig. 6, or in a universal stand, as shown in Fig. 7.

Figs. 8, 9 and 10 illustrate successive steps in the application of the invention to the manufacture of T-bars, which, as will be apparent to those skilled in the art, may be accomplished in a universal mill like that shown in Fig. 5, by merely making the lower rolls of proper form to close the passes at the bottom.

In Fig. 11 is shown diagrammatically the successive steps in the manufacture of a wide I-beam, which may also be accomplished in a universal mill like that shown in Fig. 5.

In Fig. 12 there is illustrated a pair of horizontal rolls for the manufacture of angle-bars, the finishing pass being shown separately in Fig. 13. The operation will be apparent from what has already been said.

Efforts have previously been made to provide upon the surface or surfaces of metallic articles a thin densified skin, by first forming upon the surface relatively small and closely adjacent angular ridges or projections, while preserving a regular cross-sectional general form of the piece as a whole, and then flattening said ridges or projections by pressure applied normally to the surface. The present invention is substantially different, in respect of both method of operation and product. In this case the metal piece is given a bodily cross-sectional sinuous form, and the degree of sinuosity is gradually reduced, while the edges of the piece are at the same time held against lateral spread, so that the particles composing the entire body are subjected to localized lateral compression against each other between the opposite coöperating surfaces of the rolls, and said compression is substantially uniform throughout the entire cross-section of the piece, so that the product is of a high and uniform density throughout.

I claim herein as my invention:

1. The method of densifying metal, which consists in taking a blank of sinuous cross-sectional form, and gradually and simultaneously reducing by repeatedly applied pressure the thickness and the degree of sinuosity of said blank, and confining the edges of the blank against lateral spread, whereby the particles throughout its body are compressed against each other in lines normal to the direction of the thickness-reducing pressure.

2. The method of densifying metal, which consists in taking a blank of sinuous cross-sectional form, and gradually reducing the degree of its sinuosity by pressure repeatedly applied to all parts of both of its sinuous surfaces while confining its edges against lateral spread.

3. The method of densifying metal, which consists in taking a blank of sinuous cross-sectional form, and gradually and simultaneously reducing its thickness and flattening it by pressure repeatedly applied to all parts of both of its sinuous surfaces while confining its edges against lateral spread.

4. The method of densifying metal, which consists in taking a blank of sinuous cross-sectional form, and gradually flattening it by rolling in a plurality of successive passes of diminishing degrees of sinuosity while confining its edges against lateral spread.

In testimony whereof I have hereunto set my hand.

FRANK L. O. WADSWORTH.

Witnesses:
FRANCIS J. TOMASSON,
LOUIS IONATA.